Figure 1:
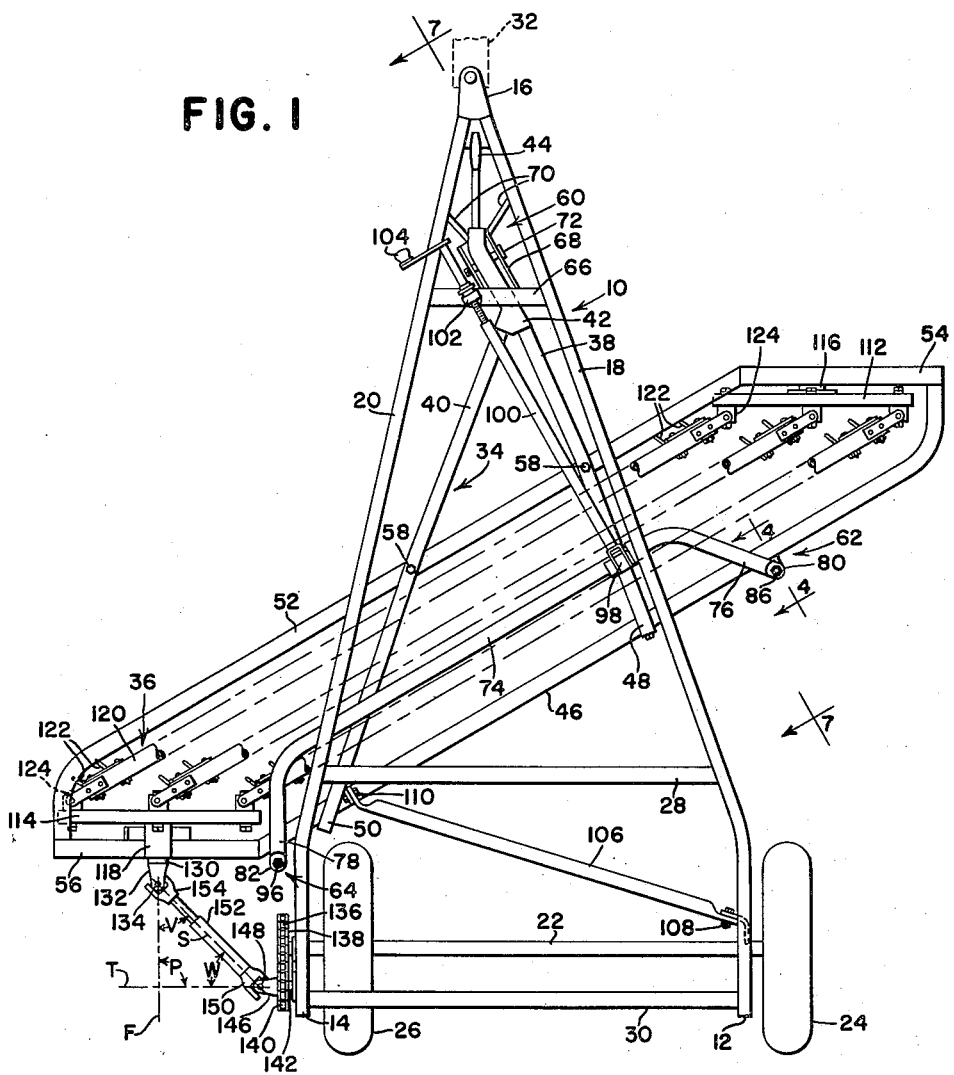

INVENTOR.
A. E. BREED

July 11, 1961 A. E. BREED 2,991,613
SIDE DELIVERY RAKE
Filed Feb. 27, 1959 3 Sheets-Sheet 3

INVENTOR.
A. E. BREED

United States Patent Office 2,991,613
Patented July 11, 1961

2,991,613
SIDE DELIVERY RAKE
Arie E. Breed, Ottumwa, Iowa, assignor to Deere & Company, Moline, Ill., a corporation of Delaware
Filed Feb. 27, 1959, Ser. No. 796,103
4 Claims. (Cl. 56—377)

This invention relates to a side-delivery rake and more particularly to means for adjusting the rake subframe for the purpose of varying the relationship of the raking teeth to the ground.

In a typical side-delivery rake, the fore-and-aft arched main frame is supported at its front end directly on a tractor or on its own wheels and is supported at its rear end on rear wheels, and a subframe suspends a basket for raking mechanism beneath the main frame and arranged diagonally to the line of advance. The raking mechanism includes a reel rotatable on an axis parallel to the diagonal disposition of the basket and this reel includes a plurality of teeth which engage the hay on the ground and cause it to be moved to one side of the machine, normally to the left. Vertical adjustment of the subframe will of course vary the relationship of the teeth to the ground, but in most cases the relationship to be varied is the angle of pitch of the teeth; that is, the inclination of the teeth relative to the ground as they approach and depart from the hay. This is a peculiarity of the machine because the rake teeth move forwardly and laterally in a motion independent of but nevertheless related to forward travel of the entire machine. Most side-delivery rakes, especially of the type connected directly to the tractor and in part supported on the tractor, use drive means established between one of the rake rear wheels and a rear portion of the rotatable reel. Because of the angles involved in the drive train, universal joints and telescopic shafting are commonly employed. The double universal joint drive involves, of course, compound angles and designers will normally attempt to utilize a driving shaft and an output shaft related at 90° to each other and will utilize the double universal joint and telescopic shaft between the driving and output shafts, splitting the angles so that the angle at each universal joint, at least in one plane, is 45° or approximately so. It is obvious that an optimum angle can be obtained with the reel set in a certain position; it is also obvious that this angle will change when the position of the reel is changed relative to the main frame, since the driving shaft is carried by the main frame and the output shaft to the reel is carried by the adjustable reel. Formerly, extreme conditions involved such changes in the angle as to affect the drive to the reel. According to the present invention, this disadvantage is eliminated by a reel mounting and an adjustment system whereby adequate angles in the universally jointed drive are obtainable in the several adjusted positions of the reel relative to the main frame.

In this respect, it is a significant object of the invention to provide an improved adjustable suspension system in which vertical adjustment of the reel, even though accompanied by fore-and-aft shifting, is such as to restore the proper angles in the universally jointed drive when the selected position has been achieved. In this system, cognizance is taken of the fact that there will be a temporary departure of the drive system from the proper angle, but when the reel is ultimately adjusted to its selected position, restoration of the proper angles will follow. Specifically, the invention has for significant objects the utilization of suspension means involving pivots and control means so related that the aforesaid general object is accomplished, the control means utilizing an arcuate guide for one end of the subframe which supports the reel and properly located pivots associated in such manner with the universally jointed drive as to achieve the foregoing results.

The foregoing and other important objects and desirable features inherent in and encompassed by the invention will become apparent as a preferred embodiment thereof is disclosed in detail in the ensuing description and accompanying sheets of drawings, the several figures of which are described below.

Figure 2:
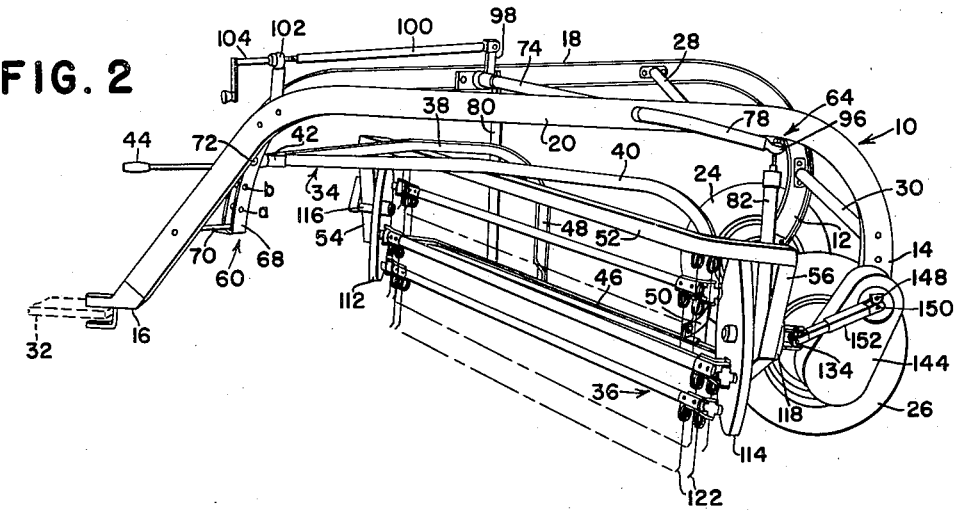
Figure 3:
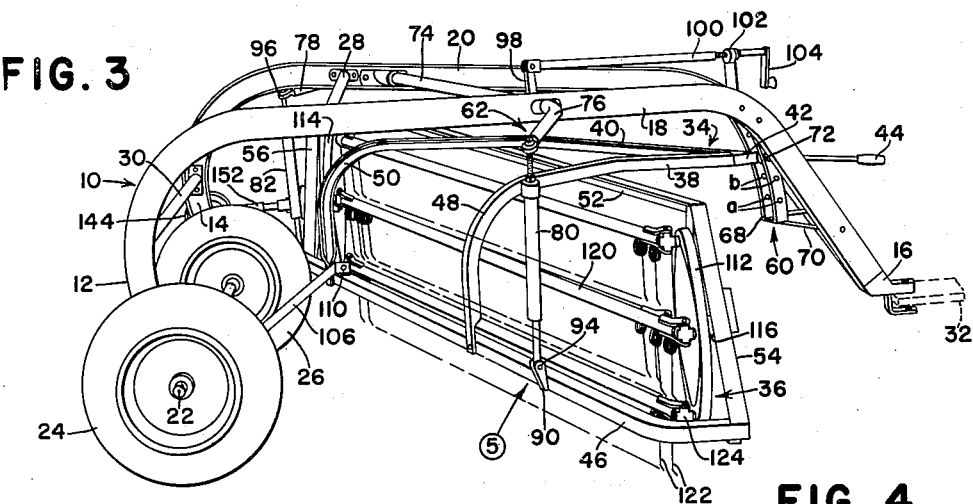
Figure 4:
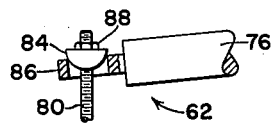
Figure 6:
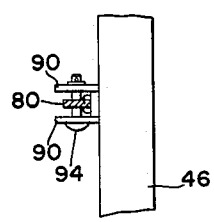
Figure 5:
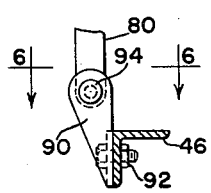
Figure 7:
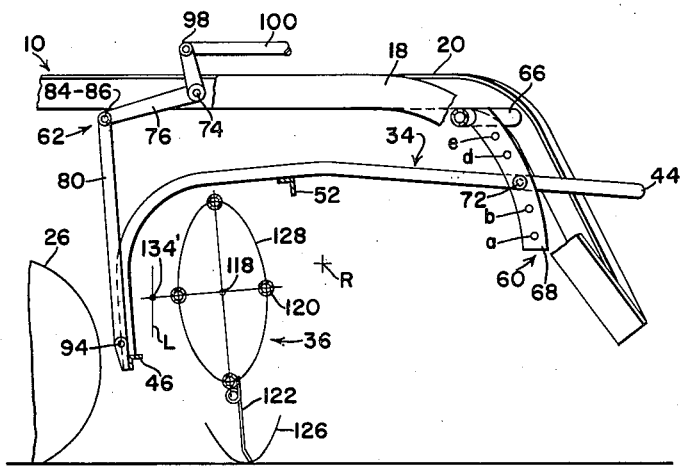
Figure 8:
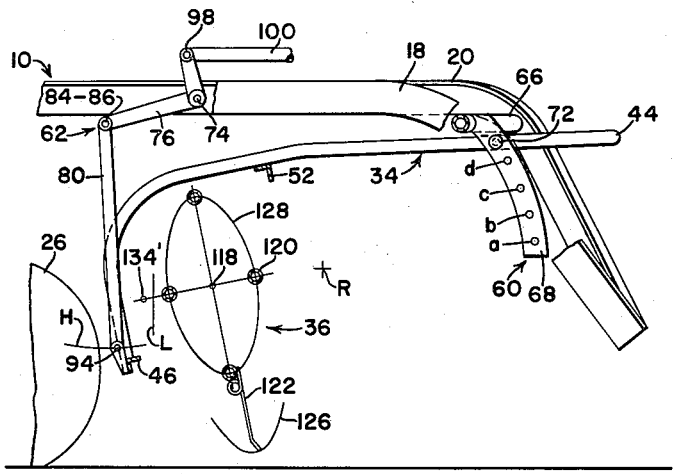
Figure 9:
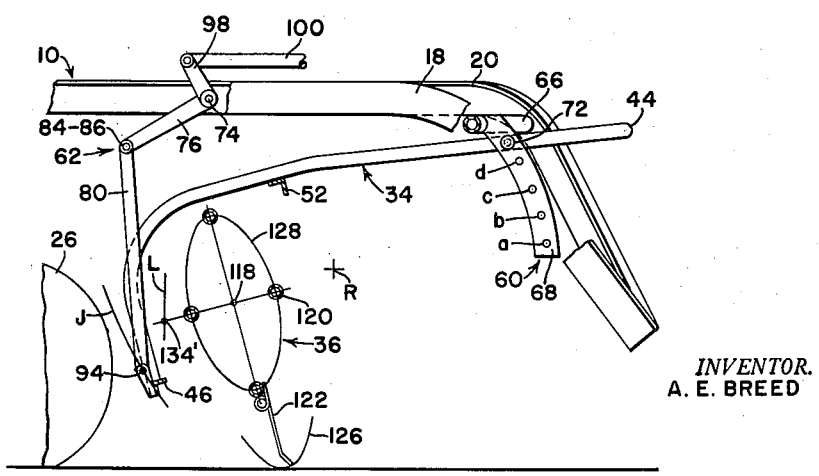

FIG. 1 is a plan view of a representative side-delivery rake embodying the invention.
FIG. 2 is a perspective of the rake as seen from one side.
FIG. 3 is a perspective of the rake as seen from the opposite side.
FIG. 4 is an enlarged fragmentary sectional view as seen on the line 4—4 of FIG. 1.
FIG. 5 is a fragmentary enlarged view illustrating structure designated by the encircled numeral 5 in FIG. 3.
FIG. 6 is a section on the line 6—6 of FIG. 5.
FIG. 7 is a schematic view, partly in section and with parts broken away, as seen substantially along the line 7—7 of FIG. 1.
FIG. 8 is a similar view showing an intermediate stage in the change from one reel position to another.
FIG. 9 illustrates the ultimate reel setting.

The rake chosen for purposes of illustration comprises a fore-and-aft main frame 10 which is arched from front to rear to afford a relatively low rear portion established by right and left hand legs 12 and 14, a forward or hitch portion 16, and a relatively high portion ahead of the rear portions 12 and 14, this high portion being established by the arch in the frame and here consisting of the intermediate portions of right and left hand side frame members 18 and 20. The lower terminal parts of the rear legs 12 and 14 carry a transverse axle 22 on which are journaled right and left hand rear wheels 24 and 26. Transverse cross braces 28 and 30 complete the basic main frame structure which, as will be noted, is supported at its rear end on the wheels 24 and 26 and which may be supported at its front end via the hitch portion 16 on the drawbar structure of a tractor, for example, as illustrated in dotted lines at 32.

A subframe 34 is disposed beneath the relatively high intermediate portion made up of the members 18—20 of the main frame 10 and in turn carries raking mechanism 36 which, as is typical, is disposed diagonally to the line of advance of the machine. The subframe includes a generally Y-shaped frame having right and left forwardly converging frame members 38 and 40 integrally joined together by a bracket 42 which has a forward extension in the form of an adjusting handle 44. As best seen in FIGS. 2 and 3, the front part of the subframe, as constituted by the bracket 42 and handle 44, is relatively high as compared to a relatively low part which is connected to a diagonally disposed rear frame bar 46 to which downwardly directed portions 48 and 50 of the frame members 38 and 40, respectively, are rigidly secured. The frame member 46 forms the rear frame part of a reel-supporting basket, the forward frame part of which is constituted by a parallel bar 52, and these bars are rigidly interconnected by front and rear or right and left lateral frame members 54 and 56, thus giving the basket the general shape of a parallelogram. The front bar 52 is rigidly connected to the subframe 34 at 58. For all practical purposes, the basket and subframe 34 may be regarded as a unit assembly.

This assembly is supported at its front end by front suspension means, designated in its entirety by the numeral 60, and is suspended at its rear end by a pair of spaced apart rear suspension means 62 and 64, the details of which will be outlined below.

The front suspension means is rigidly carried by a forward portion of the main frame 10 and for this purpose a rigidly mounted transverse support 66 carries a depending support in the form of a pair of downwardly and forwardly curved arcuate guide members which afford a guide 68, the two members being provided with vertically spaced sets of transversely alined apertures designated for purposes of convenience as *a*, *b*, *c*, *d*, and *e*. Suitable lower braces 70 serve to additionally rigidify the guide 68. A further part of the front suspension comprises a transverse removable pin 72 insertable through the front suspension frame bracket 42 and any selected pair of alined apertures just described. For example, in FIGS. 2 and 3, the pin 72 is shown as being received through the alined apertures *c*. FIGS. 8 and 9 show a different position of the forward end of the subframe basket assembly in which the pin 72 is received through alined apertures *e*.

The rear suspension means 62 and 64 operate to a large extent in unison, because they are part of a transverse rockshaft 74 which has its opposite ends formed as integral arms 76 and 78. A link 80 suspends the right hand portion of the subframe basket assembly via connection between the member 46 and the suspension arm 76, and a similar link 82 operates in the same fashion between the left hand suspension arm 78 and the left hand portion of the member 46. The details of the right hand link 80 are illustrated, but it will be clear that the same for the link 82 are duplicated. The link 80 comprises an upper threaded part which carries a hemispherical nut 84 which is received in an apertured or ring-like portion 86 of the rear end of the suspension arm 76. A lock nut 88 fixes the selected length of the link. The lower portion of the link is received between a pair of ears 90 of a bracket bolted to the rear basket frame bar 46 as at 92 (FIG. 5). A pivot pin 94 establishes the pivotal connection of the lower end of the link 80 to the basket assembly subframe. The type of pivotal connection thus established is merely representative. As previously stated, the details of the other link 82 are the same as those just described. Consequently, there will be a pivotal connection coaxial with the pivot at 94, thus establishing a diagonal pivot axis between the rear of the subframe and the rear suspension means and about which the subframe may be adjusted, as will be brought out below. The importance of this axis and its diagonal disposition relative to the front suspension means 60 should be noted. The arcuate members 68 lie in parallel planes perpendicular to this axis so that adjustment of the subframe will be confined to movement about this axis.

The upper end of the link 82 has a pivotal connection 96 with the rear end of the left hand suspension arm 78. This pivotal connection 96 is transversely alined with that established at 84—86 for the upper end of the right hand link 80. One point to be noted here is that the pivotal connections are sufficiently universal as to afford flexibility in several directions which, coupled with inherent flexibility in the framework of the subframe and basket assembly, enables movement of this assembly relative to the main frame in a desirable manner. Thus, it will be seen that rocking of the rockshaft 74 will effect adjustment of the subframe and basket assembly vertically about the pivot established by the pin 72 and the apertures in the guide or front suspension arc 68. Likewise, the forward end of the assembly may be vertically adjusted about the coaxial pivot axis established at 94 and the alined suspension axis for the other link 82, when the pin 72 is removed and the handle 44 used to vertically change the position of the subframe and basket. For the purpose of imparting rocking movement to the rockshaft 74, the rockshaft carries rigidly thereon an upstanding arm 98 which is connected to a forwardly extending link 100 journaled in a bearing 102 rigidly carried by a forward part of the main frame. The link 100 is of conventional two-piece construction in which one piece is threaded into the other and is rotatable in the bearing 102 but confined against axial shifting. The journaled part of the link has a crank 104 thereon for rotating said journaled part so as to change the length of the linkage and thereby to cause angular movement of the rockshaft 74. In general, adjustable linkages of this character are known. Thus, the crank 104 affords means for adjusting the rear end of the subframe and basket assembly, and consequently of the rake mechanism 36, and the handle 44 affords manual means for effecting adjustment of the front end of the assembly and its associated parts. During vertical movement of the subframe and basket assembly, a stabilizer 106 is effective to stabilize the structure. Opposite ends of this stabilizer are connected at 110 to the left hand rear part of the assembly and at 108 to the leg 12, it being understood that the connections are sufficiently loose as to afford almost universal movement, as is typical. Stabilizers of the general character referred to are old and well known.

The rake mechanism 36 may be of conventional construction and is here illustrated as comprising front and rear or right and left circular disks 112 and 114 journaled on the basket respectively at 116 and 118. The journaling may be effected by any suitable bearings and the axes are primarily fore and aft. The disks are cross connected by tooth-carrying pipes 120 which again are or may be of conventional construction and each pipe carries a plurality of depending rake teeth 122. The ends of the pipes are universally connected to the disks, as at 124, so as to afford the necessary flexibility for the particular type of motion peculiar to side-delivery rakes. Since this motion is or may be conventional and is therefore well understood, it will not be elaborated. Suffice it to say that when the disks 112 and 114 rotate in unison, the rake teeth follow a circular path, a portion of which appears here at 126 as a portion of an ellipse because of the plane in which FIGS. 7, 8 and 9 are viewed. Likewise, the circular path travelled by the tooth pipes 120 will appear as an ellipse as suggested schematically at 128 in the figures just noted. Also, in these figures, the left hand or rear disk bearing 118 is shown schematically and, in the interests of clarity, the schematic center of rotation is identified by the numeral 118.

The disk 114 is driven by a coaxial input or driven shaft 130, the terminal rear part of which comprises a knuckle 132 of a universal joint 134. Since the two disks 112 and 114 are interconnected by the tooth pipes 120, rotation of the disk 114 by the shaft 130 will of course entail rotation of the entire assembly, causing the tooth pipes and teeth to travel in the orbits already described.

The input or driven shaft 130 is driven from the rear wheels 24 and 26 of the rake, it being understood that overrunning clutch means, not shown, since well known, are involved in the drive. In any event, the left hand end of the axle 22 is extended to carry a sprocket 136 which, via a chain 138, drives a sprocket 140 keyed to a driven or output shaft 142. The shaft 142 is in the nature of a stub shaft mounted on the outer side of the left hand leg 14 of the main frame. Normally, this much of the driving mechanism will be enclosed by a shield, as shown at 144 in FIG. 2, but the shield has been removed in FIG. 1 to illustrate the details of the drive.

The terminal outer part or end of the output shaft 142 is in the form of a universal joint knuckle 146 which forms a universal joint at 148 with a knuckle 150 of telescopic shaft means 152 that extends between the driving shaft 142 and the driven shaft 130, the forward end of the telescopic shaft means 152 being provided with a knuckle 154 which completes the forward universal joint at 134 as previously described. The center of the joint 134 is located in FIGS. 7, 8, and 9 for reference and is shown as a small circle or "point" 134' for the sake of simplicity.

In FIG. 1, the axes of the shafts 130 and 142 are extended at F and T and it will be seen that they intersect at a right angle P, because the axis F is fore-and-aft and the axis T is transverse. Consequently, the angle of the axis of the telescopic shaft means, indicated at S, normally lies at an angle of 45° to the two axes F and T, these two angles being illustrated at V and W. In a theoretically perfect construction, the axes F, T and S will lie in a common plane. However, it will be clear that fore-and-aft shifting of the point 134′ relative to the axis T will result in changes in the angles V and W, increasing one and correspondingly decreasing the other. It is changes of this type that are accommodated by the novel suspension means disclosed here.

Stated otherwise, if the point 134′ could be caused to follow a vertical line throughout all adjustments of the subframe and basket assembly, the angles V and W would not change. That is to say, the only changes in the drive would be in the changes in the plane of the three axes F, T and P, which changes are largely negligible. A vertical line is indicated by the letter L in FIGS. 7, 8, and 9 as the theoretically correct vertical path for the universal joint center 134′ as the subframe and reel mechanism are adjusted. According to the present invention, the suspension means serves to keep the universal joint center 134′ on this line through all selected positions of the raking mechanism. Of course, the angle will change or depart from the line L in intermediate stages of adjustment, but the important thing is that the position of the universal joint 134 on or substantially on the line L will be incurred when the selected position is finally achieved.

FIG. 7 shows schematically the rake mechanism setting as illustrated in FIGS. 1, 2, and 3. The forward portion of the subframe and basket assembly is supported by the pin 72 through the guide holes c, and the rockshaft 74 is adjusted so that the suspension means 62—64 support the rear end of the basket in such manner that the rake teeth 122 properly operate in the orbit 126 in contact with the hay on the ground. It will be noted that the angle of the teeth 122 to the ground is substantially vertical. In some conditions, it is desirable to change the pitch or angle of the rake teeth, and for this purpose the entire subframe and reel mechanism are adjusted. If it is desired to make the adjustment so that the teeth 122 slope rearwardly away from the ground, the pin 72 is removed, and the subframe and basket assembly is lifted by means of the handle 44. In FIG. 8, the selected position is the uppermost that can be achieved in this particular instance, and the pin 72 is reinserted through the bracket 42 and through the uppermost set of holes e. During this phase of movement, the subframe and basket assembly will pivot generally about the pivot axis 94 between the suspension means 62—64 and the lower rear part of the assembly as represented by the angle bar 46. Because of the fore-and-aft difference between the spacing of the openings a, b, c, d, and e, there will be some fore-and-aft shifting of the assembly, which will occur in an arc H having as its center the axis on which lie the pivot means 84—86 and 96 which, as previously described, are coaxial.

The position in FIG. 8 is only an intermediate position, since the teeth 122, although inclined rearwardly to the ground, are out of contact with the ground. It therefore remains to accomplish a further adjustment which results in lowering the teeth 122. This is accomplished via the linkage 100 and the rockshaft 74, which in this case are operated so that the rockshaft 74 turns counterclockwise, lowering the suspension points 84—86 and 96 and consequently lowering the rear end of the subframe and basket assembly. This portion of the assembly swings through an arc J which has as its center the axis of the pin 72. Lowering is accomplished to an extent necessary to place the teeth 122 back in proper spaced relation to the ground. In the present case, the teeth are shown in contact with the ground as a means of ready reference.

Of importance here is the fact that in the intermediate stage as shown in FIG. 8, elevation of the forward end of the assembly to achieve the change in position of the pin 72 from the holes c to the holes e causes rearward shifting of the assembly. This will be readily seen by the rearward displacement of the center 134′ of the universal joint 134 from the theoretically perfect vertical line L. Of greater significance is the fact that when the rear suspension means 62—64 is operated to lower the assembly to its proper position the assembly is displaced forwardly so that the point 134′ is again restored to the line L. Although the point 134′ will occupy a position lower than that occupied in FIG. 7, for example, it will be restored to its proper fore-and-aft position. Consequently, the arrangement maintains the two angles V and W substantially as they originated, and there will be no change in the drive caused by alterations in these two critical angles. As will be evident to those versed in the art, excessive changes in these angles will adversely affect the substantially constant velocity of the rake mechanism, since only simple universal joints are used in the interests of simplicity and economy.

Readjustment of the subframe and basket assembly from the status of FIG. 9 to that of FIG. 7 will be readily understood, since the reversal of the previously described procedure will occur. Likewise, the change from the position of FIG. 7 to one in which the pin 72 occupies the lowermost set of holes a will be understood. In all cases, although there is a temporary displacement of the universal joint center 134′ from the line L, the center is restored to a position on the line when the ultimate setting of the subframe and basket assembly is achieved.

Another important feature should be noted and that is that other components, in addition to the universal joint center 134′, will, although temporarily displaced fore and aft from a vertical line passing through their respective original positions, return to such vertical line. This is important from the standpoint of locating the rear member 46 relative to the wheels 24 and 26. That is to say, if the mechanism were not designed with the proper accommodation for retaining the ultimate position of the basket subframe and assembly, the original spacing in a fore-and-aft direction between the wheels 24 and 26 and the rear part of the basket as represented by the frame member 46 would have to be such as to allow movement of the member 46 toward and away from the wheels in all operative positions of the rake. In the present case, the member 46 will, in all operative positions, occupy substantially the same relationship to the wheels. This enables the wheels in the first place to be placed relatively close to the rake mechanism, which is desirable from the standpoint of gauging the operation of the rake teeth relative to the ground and crop.

One characteristic of the construction that makes the present design possible is that the axis of the pivot 94 and the associated pivotal connection between the link 82 and the rear end of the basket is substantially below the level of that occupied by the universal joint 134 and its related axes F, T, and S. Consequently, as the subframe and basket assembly pivots about the axis 94 when its forward end is adjusted about the arc of the guide 68, fore-and-aft displacement of the universal joint 134 occurs. This is further augmented by the swinging relationship through the arc H because of the suspension via the links 80 and 82 in the rear suspension means 62 and 64. Related to this is the shape of the guide 68, which is calculated relative to the previously described centers and axes so that its own center, as at R, is well forward of the axis 94 and at a level somewhat thereabove. In the present case, it will be noted that the point R is substantially midway between the arc of the guide 68 and the axis 94, and it is likewise substantially midway between the ground and the level of the side frame parts 18 and 20 of the main frame 10. Although these may be varied within limits, it will be noted that the broad result obtained is that the front and rear suspension means are so constructed that ultimate changes in position of the subframe and basket assembly are achieved without substantially changing the angles V and W.

The foregoing illustrates the salient features and results obtainable by the preferred construction. Other features not categorically enumerated will readily occur to those versed in the art, as will many modifications and alterations in the structure disclosed, all of which may be achieved without departure from the spirit and scope of the invention.

What is claimed is:

1. A side-delivery rake, comprising: a fore-and-aft main frame arched from front to rear to afford a relatively low rear portion and a relatively high portion ahead of said rear portion; a subframe and basket assembly beneath the high portion and having a relatively low rear part and a relatively high front part; raking mechanism carried by the assembly and having movable rake teeth operative proximate to the ground; rear suspension means including a vertically adjustable element on the main frame high portion and depending link means pivoted at its upper end to said element and pivoted at its lower end to the rear part of said assembly on a relatively low transverse rear suspension axis; a driving shaft journaled on the main frame rear portion on a transverse axis rearwardly of the rear suspension axis and having a terminal outer end; a driven shaft connected to the raking mechanism and journaled on the assembly on a generally fore-and-aft relatively low axis above the level of the rear suspension axis and laterally outwardly of the terminal end of the driving shaft, said driven shaft having a rear terminal end forwardly and laterally outwardly of the driving shaft; drive mechanism including telescopic shaft means extendnig between the terminal ends of said shafts normally at an angle of substantially 45° to both shafts, said drive mechanism including a front universal joint connected to the terminal end of the driven shaft and a rear universal joint connected to the terminal end of the driving shaft; and front suspension means including a front transverse pivot on the assembly front part and a cooperating depending support carried by the main frame and constructed to provide a plurality of vertically spaced apart front pivot-receiving positions arranged on a downward and forward arc, said front pivot being settable in any selected position on said support and being selectively adjustable from one position to anotheer so as to swing the assembly about the rear suspension axis for varying the height of the rake teeth and thus to cause fore-and-aft displacement of the front universal joint whereby to alter the angle of the telescopic shaft means; and said rear suspension elements being thence adjustable to swing the assembly about the selectively positioned front pivot for restoring the height of the rake teeth and also thus causing re-shifting of the front universal joint to substatnially restore the aforesaid angle of the telescopic shaft means.

2. The invention defined in claim 1, in which: the raking mechanism is diagonal to the main frame and the rear suspension axis generally parallels said raking mechanism; and the depending support lies in a plane normal to said rear suspension axis.

3. A side-delivery rake, comprising: a fore-and-aft main frame arched from front to rear to afford a relatively low rear portion and a relatively high portion ahead of said rear portion; a subframe and basket assembly beneath the high portion and having a relatively low rear part and a relatively high front part; raking mechanism carried by the assembly and having movable rake teeth operative proximate to the ground; a driving shaft journaled on the main frame rear portion on a transverse axis rearwardly of the assembly and having a terminal outer end; a driven shaft connected to the raking mechanism and journaled on the assembly and basket assembly on a generally fore-and-aft relatively low axis above the ground and laterally outwardly of the terminal end of the driving shaft, said driven shaft having a rear terminal end forwardly and laterally outwardly of the driving shaft; drive mechanism including telescopic shaft means extending between the terminal ends of said shafts normally at an angle of substantially 45° to both shafts, said drive mechanism including a front universal joint connected to the terminal end of the driven shaft and a rear universal joint connected to the terminal end of the driving shaft; and front and rear suspension means suspending the assembly from the main frame and vertically adjustable for varying the position of the rake teeth relative to the ground and said suspension means being so constructed that ultimate changes in position of the assembly are achieved without substantially changing the aforesaid angle of the telescopic shaft means relative to said driving and driven shafts.

4. A side-delivery rake, comprising: a fore-and-aft main frame arched from front to rear to afford a relatively low rear portion and a relatively high portion ahead of said rear portion; a subframe and basket assembly beneath the high portion and having a relatively low rear part and a relatively high front part; raking mechanism carried by the assembly and having movable rake teeth operative proximate to the ground; a driving shaft journaled on the main frame rear portion on a transverse axis rearwardly of the assembly and having a terminal outer end; a driven shaft connected to the raking mechanism and journaled on the assembly on a generally fore-and-aft relatively low axis above the ground and laterally outwardly of the terminal end of the driving shaft, said driven shaft having a rear terminal end forwardly and laterally outwardly of the driving shaft; drive mechanism including telescopic shaft means extending between the terminal ends of said shafts normally at an angle of substantially 45° to both shafts, said drive mechanism including a front universal joint connected to the terminal end of the driven shaft and a rear universal joint connected to the terminal end of the driving shaft; and front and rear suspension means suspending the assembly from the main frame and vertically adjustable for varying the positon of the rake teeth relative to the ground and said front and rear suspension means respectively including front and rear transverse pivotal connections to the assembly, both connections being spaced fore-and-aft from the front universal joint, and said front and rear suspension means being individually and sequentialy adjustable to tilt the assembly first about one connection and thereby to affect the angle of the telescopic shaft means and thence about the other axis to substantially restore said angle to 45°.

References Cited in the file of this patent

UNITED STATES PATENTS

| | | |
|---|---|---|
| 2,746,233 | McClellan et al. | May 22, 1956 |
| 2,781,626 | Happe et al. | Feb. 19, 1957 |
| 2,861,415 | Carlson et al. | Nov. 25, 1958 |